(12) United States Patent
Sayyed et al.

(10) Patent No.: US 12,223,329 B2
(45) Date of Patent: Feb. 11, 2025

(54) DETECTION AND REMEDIATION OF RUNTIME CRASHES IN HETEROGENEOUS OPERATING ENVIRONMENTS

(71) Applicant: Dell Products L.P., Round Rock, TX (US)

(72) Inventors: Ibrahim Sayyed, Georgetown, TX (US); Adolfo S. Montero, Pflugerville, TX (US); Amit Kumar Tiwari, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 18/311,001

(22) Filed: May 2, 2023

(65) Prior Publication Data

US 2024/0370271 A1    Nov. 7, 2024

(51) Int. Cl.
| | | |
|---|---|---|
| *G06F 9/4401* | (2018.01) | |
| *G06F 11/07* | (2006.01) | |
| *G06F 11/10* | (2006.01) | |
| *G06F 11/14* | (2006.01) | |
| *G06F 11/22* | (2006.01) | |
| *G06F 11/30* | (2006.01) | |

(52) U.S. Cl.
CPC ........ *G06F 9/4401* (2013.01); *G06F 11/0757* (2013.01); *G06F 11/0772* (2013.01); *G06F 11/0778* (2013.01); *G06F 11/0787* (2013.01); *G06F 11/079* (2013.01); *G06F 11/1024* (2013.01); *G06F 11/1417* (2013.01); *G06F 11/1441* (2013.01); *G06F 11/2236* (2013.01); *G06F 11/3089* (2013.01)

(58) Field of Classification Search
CPC ............... G06F 9/4401; G06F 11/0757; G06F 11/0772; G06F 11/0778; G06F 11/0787; G06F 11/079; G06F 11/1024; G06F 11/1417; G06F 11/1441; G06F 11/2236; G06F 11/3089
See application file for complete search history.

(56) References Cited

U.S. PATENT DOCUMENTS

| | | | |
|---|---|---|---|
| 2011/0208955 A1* | 8/2011 | Anbazhagan ....... | G06F 11/1417 713/2 |
| 2012/0110380 A1* | 5/2012 | Verdun ............... | G06F 11/0745 714/24 |
| 2012/0144242 A1* | 6/2012 | Vichare ................ | G06F 11/076 714/39 |
| 2023/0409423 A1* | 12/2023 | Chaiken .............. | G06F 11/1417 |

* cited by examiner

*Primary Examiner* — Terrell S Johnson
(74) *Attorney, Agent, or Firm* — Jackson Walker L.L.P.

(57) ABSTRACT

An information handling system may include a host system including at least one host processor and a basic input/output system (BIOS); and an embedded controller (EC) including an EC processor. In response to the information handling system receiving an instruction from a user to initiate a forced power off, the EC may be configured to: store diagnostic information indicating a state of the host system; and upon a subsequent boot of the host system, transmit information to the BIOS indicating the forced power off.

18 Claims, 2 Drawing Sheets

DETECTION AND REMEDIATION OF RUNTIME CRASHES IN HETEROGENEOUS OPERATING ENVIRONMENTS

TECHNICAL FIELD

The present disclosure relates in general to information handling systems, and more particularly to the detection and remediation of crashes in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of crashes may occur in information handling systems, and they may manifest as a blank screen or a "blue screen of death" (BSOD), an abrupt lockup, a frozen application or operating system (OS), a kernel panic, etc. Some OSes attempt to mitigate crashes by creating a record of the system state at the time of the crash (e.g., a crash dump or mini-dump file, etc.).

However, the creation of such records may require a noticeable amount of time, and users may not always be willing to wait. Thus in some instances, a user may force the system to power off by pressing the power button (e.g., holding the power button for a set amount of time such as 4 seconds) to trigger a forced shutdown.

Such a power-down override generally does not leave much or any logging information to analyze the crash, and so it can be difficult to diagnose the cause of the crash. It would be advantageous to be able to capture diagnostic and/or telemetry information even in situations in which a user triggers a forced shutdown of an information handling system.

Many information handling systems include an embedded controller (EC), which may be implemented with a microcontroller configured to carry out various low-level system tasks. Embodiments of this disclosure may leverage an EC to capture diagnostic information as discussed below. Embodiments may be implemented in a cross-architecture, SoC-agnostic fashion, enabling their use in x86-64, AARCH64, and other processor architectures. Embodiments may also be OS-agnostic, functioning during runtime of any OS as well as in a pre-boot environment such as a Unified Extensible Firmware Interface (UEFI) environment.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with detecting and remediating crashes may be reduced or eliminated.

In accordance with embodiments of the present disclosure, an information handling system may include a host system including at least one host processor and a basic input/output system (BIOS); and an embedded controller (EC) including an EC processor. In response to the information handling system receiving an instruction from a user to initiate a forced power off, the EC may be configured to: store diagnostic information indicating a state of the host system; and upon a subsequent boot of the host system, transmit information to the BIOS indicating the forced power off.

In accordance with these and other embodiments of the present disclosure, a method may include an information handling system receiving an instruction from a user to initiate a forced power off; in response to the instruction, an embedded controller (EC) of the information handling system storing diagnostic information indicating a state of a host system of the information handling system; and upon a subsequent boot of the host system, the EC transmitting information to a BIOS of the information handling system indicating the forced power off.

In accordance with these and other embodiments of the present disclosure, an article of manufacture may include a non-transitory, computer-readable medium having computer-executable code thereon that is executable by an information handling system for: receiving an instruction from a user to initiate a forced power off; in response to the instruction, an embedded controller (EC) of the information handling system storing diagnostic information indicating a state of a host system of the information handling system; and upon a subsequent boot of the host system, the EC transmitting information to a BIOS of the information handling system indicating the forced power off.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
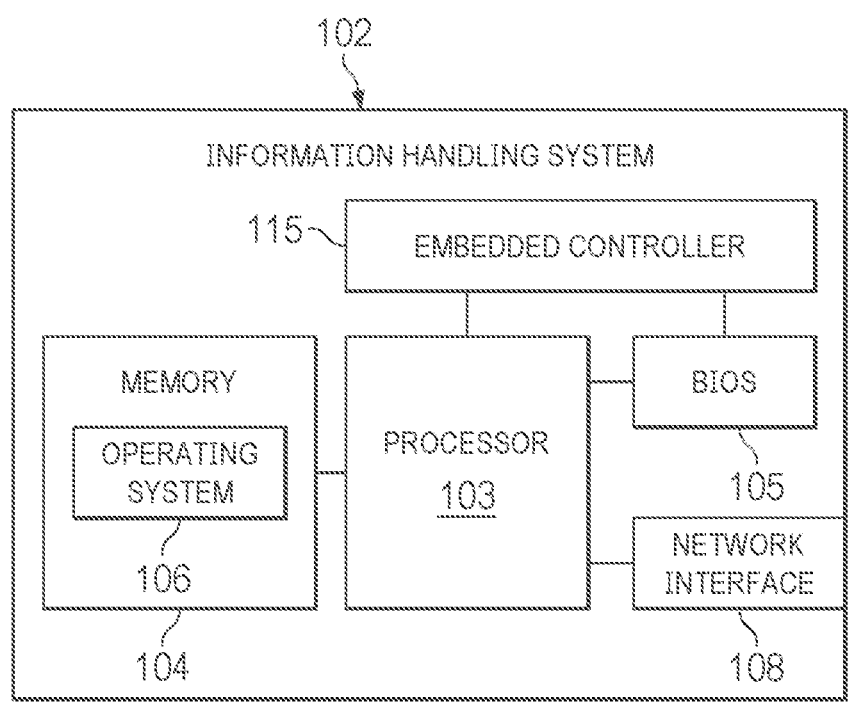
FIG. 1 illustrates a block diagram of an example information handling system, in accordance with embodiments of the present disclosure.
Figure 2:
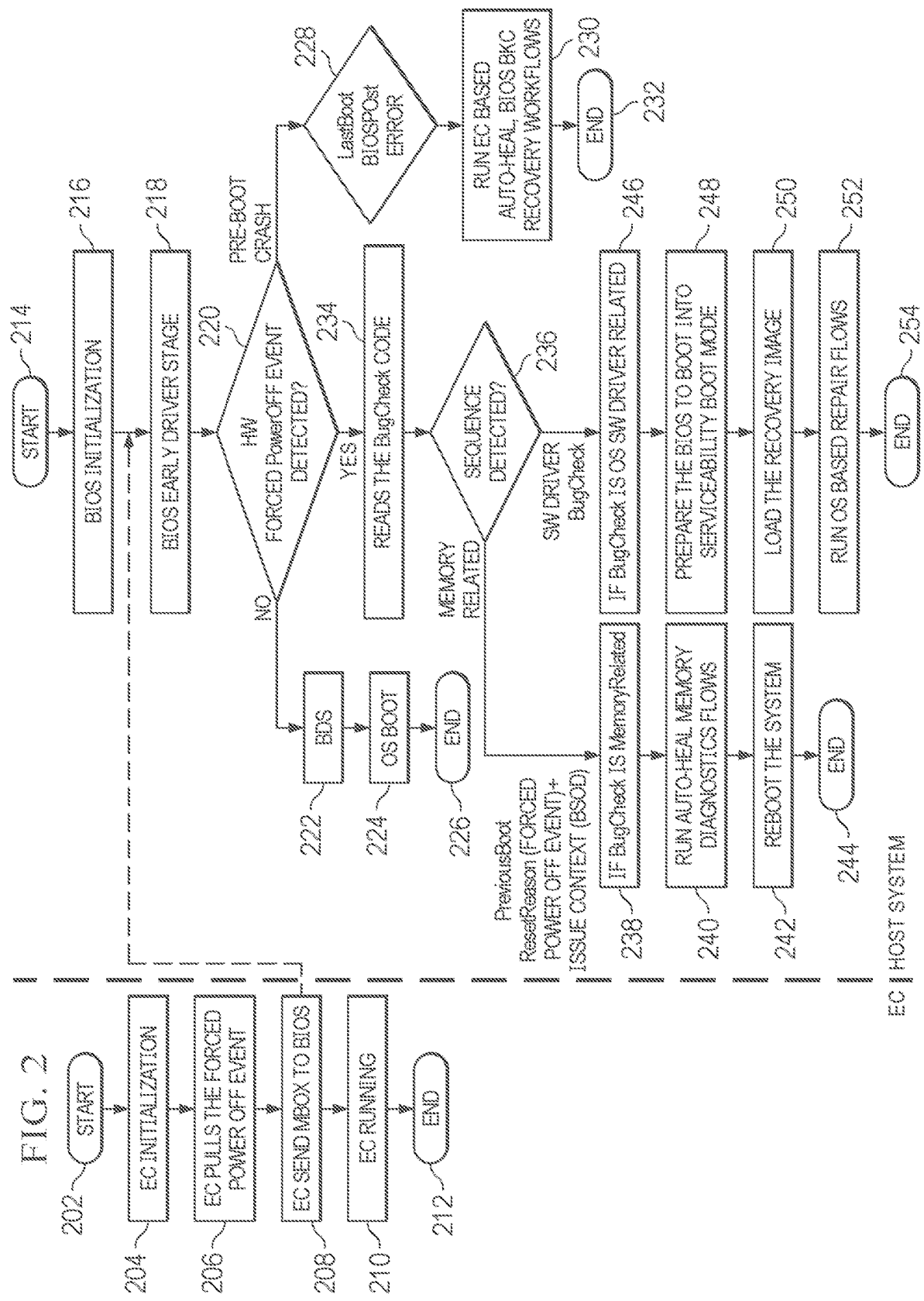
FIG. 2 illustrates an example method, in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), a remote access controller (e.g., a Dell Remote Access Controller (DRAC) or Integrated Dell Remote Access Controller (iDRAC)), or an embedded controller (EC).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., 108 network interface for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may further include a management controller such as embedded controller (EC) 115. EC 115 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. EC 115 may be configured to provide management functionality for the management of information handling system 102. Such management may in some embodiments be made by EC 115 even if information handling system 102 is powered off or powered to a standby state. EC 115 may include a processor, a memory, and a network interface that may be separate from and physically isolated from network interface 108 in some embodiments. EC 115 may be coupled to a management network, which may be separate from and physically isolated from the data network coupled to network interface 108.

In some embodiments, EC 115 may be a microcontroller with its own memory, and it may be used to manage any of various low-level system tasks within information handling system 102.

EC 115 may be communicatively coupled to processor 103, BIOS 105, and/or any other suitable components of information handling system 102, for example via a Universal Serial Bus (USB), System Management Bus (SMBus), and/or one or more other communications channels.

As discussed above, embodiments of this disclosure may leverage EC 115 to store diagnostic data when information handling system 102 experiences a crash. This capability may be particularly relevant when a user forces a shutdown of information handling system 102 by pressing and holding the power button for a predetermined amount of time (typically 4 seconds), which may prevent existing methods of collecting diagnostic data from operating, but which typically allows EC 115 to keep operating.

A crash may occur at any time (e.g., during a pre-boot phase or during runtime of an OS). Typically, however, when the host system of information handling system 102 executing on processor 103 crashes, EC 115 will continue to operate normally. Thus as described in more detail below, EC 115 may monitor for a forced power-down event and take action in response. For example, EC 115 may collect diagnostic data relating to the crash and/or to the state of information handling system 102 and log the diagnostic data to a storage resource before triggering the actual shutdown. The storage resource may be implemented as non-volatile random access memory (NVRAM) accessible to BIOS 105 and/or EC 115 in some embodiments.

Turning now to FIG. 2, a flow chart of an example method for detecting and remediating a crash is shown, according to some embodiments. As shown at steps 202-212, the EC may initialize, carry out normal operations, and wait for detection of a forced power off event.

When such an event is detected (typically triggered by the user holding down the power button for the designated time period), the EC may transmit an indication of the forced power off to the BIOS upon a subsequent boot of the host system via MBOX, which is one method of carrying out I/O between the CPU and the EC. In some embodiments, the EC may also capture diagnostic information (e.g., by using memory-mapped input/output (MMIO) to read the state of OS and/or program execution on the host system). The EC may then pass this information to the host BIOS as well upon the subsequent boot, or it may store the diagnostic information in a location accessible to the BIOS such that the BIOS can retrieve it.

Meanwhile, the host system may be executing its normal initialization at steps 214-218, for example having been rebooted after a forced power off. At step 218, the host BIOS may receive an indication of the forced power off and/or a set of diagnostic information from the EC, and it may then determine how to proceed at step 220 based on the circumstances of the crash.

For example, if no forced power off event was detected, the host system may proceed to normal boot at steps 222-226.

If the diagnostic information indicates that a pre-boot crash occurred (e.g., in the UEFI stage of boot), then the host system may execute one or more auto-healing and/or best-known-configuration (BKC) recovery workflows at steps 228-232 to reset (or partially reset) the pre-boot system to a working state.

If the diagnostic information includes a OS BugCheck code or the like, then at steps 234 and 236 the host system may determine the nature of the crash and proceed accordingly.

For example, in the event that the crash was caused by a memory-related issue (e.g., bad physical memory or a run-time memory failure), then an OS-level crash handler may have logged the BugCheck code inside a BIOS-accessible NVRAM store. When the BIOS detects the forced power off event information from the EC, the BIOS may display an error message to the user at boot (e.g., "BIOS has detected a memory error, do you want to run diagnostics?"). If user chooses "Yes," then the BIOS may initiate a memory diagnostic auto-healing workflow to check for bad memory regions and mark them unusable, etc. as shown at steps 238-244.

In the event that the crash was caused by a software/driver issue, the BIOS may display a different error message (e.g., "Do you want to repair the Driver/OS?"). If the user chooses "Yes," then the BIOS may initiate a repair workflow as shown at steps 246-254.

For example, an attempt may first be made to recover the faulty driver. This may include executing a network boot to retrieve a driver recovery image and signaling to the service OS (SOS) to start an OS-based driver repair flow. (The term "service OS" refers generally to any bootable recovery OS that is for repair of the information handling system, rather than for general purpose use.)

If the driver repair flow fails, then an attempt may be made to recover the entire OS image. This may include executing a network boot to retrieve an OS recovery image and signaling to the SOS to start an OS recovery repair flow.

One of ordinary skill in the art with the benefit of this disclosure will understand that the preferred initialization point for the method depicted in FIG. 2 and the order of the steps comprising the method may depend on the implementation chosen. In these and other embodiments, the method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system including at least one host processor and a basic input/output system (BIOS); and
an embedded controller (EC) including an EC processor;
wherein, in response to the information handling system receiving an instruction from a user to initiate a forced power off, the EC is configured to:
store diagnostic information indicating a state of the host system; and
upon a subsequent boot of the host system, transmit information to the BIOS indicating the forced power off.

2. The information handling system of claim 1, wherein the instruction from the user includes a prolonged press on a power button of the information handling system.

3. The information handling system of claim 1, wherein storing the diagnostic information includes accessing a memory of the host system via memory-mapped input/output (MMIO).

4. The information handling system of claim 1, wherein, upon the subsequent boot of the host system, the BIOS is configured to execute a remediation procedure based on the diagnostic information.

5. The information handling system of claim 4, wherein the remediation procedure is selected from the group consisting of performing a partial reset of a pre-boot environment of the host system, performing a memory diagnostic, replacing a driver, and replacing an operating system.

6. The information handling system of claim 1, wherein the EC is configured to store the diagnostic information further in response to a crash of the host system.

7. A method comprising:
an information handling system receiving an instruction from a user to initiate a forced power off;
in response to the instruction, an embedded controller (EC) of the information handling system storing diagnostic information indicating a state of a host system of the information handling system; and
upon a subsequent boot of the host system, the EC transmitting information to a BIOS of the information handling system indicating the forced power off.

8. The method of claim 7, wherein the instruction from the user includes a prolonged press on a power button of the information handling system.

9. The method of claim 7, wherein storing the diagnostic information includes accessing a memory of the host system via memory-mapped input/output (MMIO).

10. The method of claim 7, wherein, upon the subsequent boot of the host system, the BIOS is configured to execute a remediation procedure based on the diagnostic information.

11. The method of claim 10, wherein the remediation procedure is selected from the group consisting of performing a partial reset of a pre-boot environment of the host system, performing a memory diagnostic, replacing a driver, and replacing an operating system.

12. The method of claim 7, wherein the EC is configured to store the diagnostic information further in response to a crash of the host system.

13. An article of manufacture comprising a non-transitory, computer-readable medium having computer-executable code thereon that is executable by an information handling system for:
receiving an instruction from a user to initiate a forced power off;
in response to the instruction, an embedded controller (EC) of the information handling system storing diagnostic information indicating a state of a host system of the information handling system; and
upon a subsequent boot of the host system, the EC transmitting information to a BIOS of the information handling system indicating the forced power off.

14. The article of claim 13, wherein the instruction from the user includes a prolonged press on a power button of the information handling system.

15. The article of claim 13, wherein storing the diagnostic information includes accessing a memory of the host system via memory-mapped input/output (MMIO).

16. The article of claim 13, wherein, upon the subsequent boot of the host system, the BIOS is configured to execute a remediation procedure based on the diagnostic information.

17. The article of claim 16, wherein the remediation procedure is selected from the group consisting of performing a partial reset of a pre-boot environment of the host system, performing a memory diagnostic, replacing a driver, and replacing an operating system.

18. The article of claim 13, wherein the EC is configured to store the diagnostic information further in response to a crash of the host system.

\* \* \* \* \*